United States Patent [19]
van den Brandt

[11] Patent Number: 4,969,730
[45] Date of Patent: Nov. 13, 1990

[54] IMAGE PROJECTION ARRANGEMENT

[75] Inventor: Andrianus H. J. van den Brandt, Eindhoven, Netherlands

[73] Assignee: U.S. Philips Corporation, New York, N.Y.

[21] Appl. No.: 327,288

[22] Filed: Mar. 22, 1989

[30] Foreign Application Priority Data

Oct. 13, 1988 [NL] Netherlands .................. 8802517

[51] Int. Cl.⁵ .............................................. G03B 21/28
[52] U.S. Cl. ........................................ 353/31; 353/30; 353/34; 353/37; 350/173; 350/174; 350/171; 350/169
[58] Field of Search ...................... 353/122, 37, 38, 34, 353/33, 81, 31, 30; 350/174, 173, 172, 171, 170, 169, 286, 402, 401, 403

[56] References Cited

U.S. PATENT DOCUMENTS

| | | | |
|---|---|---|---|
| 3,659,918 | 5/1972 | Tan | 350/173 |
| 3,677,621 | 7/1972 | Smith | 350/173 |
| 3,932,027 | 1/1976 | Cook et al. | 358/55 |
| 4,084,180 | 4/1978 | Stoffels et al. | 350/173 |
| 4,127,322 | 11/1978 | Jacobson et al. | 353/31 |
| 4,335,939 | 6/1982 | Stovell et al. | 350/403 |
| 4,500,172 | 2/1985 | Gagnon et al. | 353/31 |
| 4,545,651 | 10/1985 | Kato et al. | 350/174 |
| 4,564,931 | 1/1986 | O'Hara et al. | 350/401 |
| 4,818,074 | 4/1989 | Yokoi et al. | 350/338 |
| 4,826,311 | 5/1989 | Ledebuhr | 353/33 |

FOREIGN PATENT DOCUMENTS

| | | | |
|---|---|---|---|
| 0262130 | 12/1985 | Japan | 350/402 |
| 0311322 | 12/1988 | Japan | 350/402 |

Primary Examiner—William A. Cuchlinski, Jr.
Assistant Examiner—William C. Dowling

[57] ABSTRACT

An image projection arrangement is described which comprises a light source (1) for producing a first light beam ($b_1$), a reflective image display system (10) provided in the path of this light beam and a projection lens system (20), arranged in the path of a second light beam ($b_2$) originating from the image display system. A beam-separating element (5) whose operating principle is based on total internal reflection of one of the beams ($b_1$, $b_2$) is provided in the light path between the light source and the image display system on the one hand and said system and the projection lens system on the other hand. This sresults in an adequate separation of these beams while the dimensions of the arrangement remain limited.

8 Claims, 4 Drawing Sheets

IMAGE PROJECTION ARRANGEMENT

The invention relates to an image projection arrangement comprising a light source for producing a first light beam, a reflective image display system arranged in the path of the first light beam and having at least one image display panel for generating an image to be projected, a projection lens system arranged in the path of a second light beam originating from the image display system for projecting the image produced by the image display system onto a projection screen.

The notion image projection arrangement must be understood in a very general sense and comprises an arrangement for displaying, for example, a video image, a graphic image, numerical information or a combination thereof. The images may be both monochrome and colour images. In the latter case, the display system may have three colour channels for, for example, the primary colours red, green and blue, each channel including a display panel. A monochrome image must be understood to mean an image having only one colour, the colour in principle corresponding to a given wavelength and in practice to a wavelength band around this given, central, wavelength. Such an image can be formed by what is commonly referred to as a monochromatic beam having a central wavelength and possibly a wavelength band therearound. The projection screen may form part of the arrangement and can terminate this arrangment at one side. It is alternatively possible for the screen to be positioned at some distance from the arrangement and to be constituted by, for example, a wall with a suitable reflection.

The European Patent Application no. 0 166 194 discloses an image projection arrangement including a reflective image display panel having a layer of liquid crystalline material, which layer is provided between two electrode plates. This image display panel is known by the abbreviation LCD of: Liquid Crystal Display. When a reflective image display panel is used it must be ensured that the seocnd beam reflected by the panel is spatially separated to a sufficient extent from the first beam, originating from the radiation source, so as to ensure that the projection lens system arranged in the path of the second beam does not also intercept a portion of the first light beam. To that end, in the arrangement disclosed in the European Patent Application no. 0 166 194 the chief ray of the first beam is incident on the image display panel at a predetermined angle, deviating from 90°, denoted the angle of incidence to the normal on the panel. The chief ray of the second beam is then reflected at an equally large but opposite angle, so that the chief rays of the first and second beams have different directions and enclose an angle equal to twice the angle of incidence. So as to provide a sufficient separation between the first and second beams the angle of incidence must be relatively large. Especially when an LCD panel is used, it is however usually desirable for the angle of incidence of the first beam to be preferably zero and not more than some degrees. The full separation of the two beams then occurs only at a relatively large distance from the image display panel, so that the image projection arrangement must then be relatively long.

The present invention has for its object to provide an image projection arrangement of a compact structure, whilst the angle of incidence of the first beam on the image display panel can still be small. To that end the arrangement, according to the invention, is characterized in that between the light source and the image display system on the one hand and between this system and the projection lens system on the other hand a transition from a first to a second medium is provided, these media having different refractive indices, the transition being arranged such that one of the first and second light beams is totally reflected by the transition whilst the other light beam is transmitted by the transition.

Said transition effects also at a small angle between the chief rays of the first and second beams a drastic separation of these chief rays, and consequently of these beams, so that the projection lens system can be arranged relatively close to the said transition.

In principle, any transition between two transparent media can be used as the transition, provided the refractive indices of these media are sufficiently large. Preferably however the arrangement is further characterized in that the transition is constituted by an interface between air and a transparent material.

This preferred embodiment may have the further characteristic that the transition is included in a system of prisms formed by two transparent prisms having an air layer between two facing surfaces of the prisms.

Since the transition is enclosed in the prism system it is appropriately protected from contamination and damage. Of the composite prism the incidence face for the first beam and the exit face for the second beam may have an equal orientation relative to the main axis of the first and the second beam, respectively, as an image display panel, so that optical aberrations can be corrected in a simplest possible way.

An embodiment of the image projection arrangement in which the image display system modulates the polarization direction of the second light beam in accordance with the image information and in which an optimum use of the available light is made, has the further characteristic that in the radiation path from the light source to the transition on the one hand and in the radiation path from this transition to the projection lens system on the other hand a polarization-sensitive beam splitter is provided for splitting the beam originating from the lightsource into two mutually perpendicularly polarized sub-beams which are both incident on the image display system and for recombining these two sub-beams after they have been modulated with the image information.

Whereas in more conventional image projection arrangements comprising polarization-rotational display panels only light of a given first polarization direction is transmitted to these panels, in the last-mentioned embodiment of the arrangement according to the invention also light having a second polarization direction perpendicular to the first polarization direction, so basically all the light from the source, is modulated with the image information so that an optimum use is made of the available light.

It should be noted that from the U.S. Pat. No. 4,127,322 it is known per se, with the object of increasing the luminous flux, to modulate two mutually perpendicularly polarized light beams originating from the same source with the same picture information and to recombine these beams thereafter. In the prior art arrangement each light beam is modulated by an individual image display panel so that twice the number of panels are required as in the arrangement according to the invention. In addition, in the prior art arrangement the modulated second beam is split from the unmodulated first beam by a polarization-sensitive beam splitter and not by an element whose mode of operation is based on total internal reflection.

A practically important embodiment of the image projection arrangement according to the present invention, is characterized in that the image display system is a colour image display system comprising colour-selective elements and a composite image display panel whose image elements are divided into groups, each group of image elements generating a sub-image of a predetermined colour corresponding to the colour of the colour-selective elements belonging to the relevant group of image elements.

This colour image display system may be further characterized in that the colour-selective elements are constituted by a plurality of colour-selective beam splitters for splitting a light beam into three monochromatic sub-beams of different colours and for combining the sub-beams modulated with monochrome image information into a colour image information-modulated light beam, and that in the path of each of the sub-beams a separate image display panel is provided whose collective image elements constitute one of said groups of image elements.

Alternatively, this embodiment may be further characterized in that the colour image display system includes one image display panel whose image elements are arranged in groups, each group generating a sub-image of a given colour and that for each of the image elements a colour filter is provided which only transmits light of that colour which corresponds to the colour of the sub-image to be generated by the group to which the relevant image element belongs.

The embodiment with the alternative characterizing feature has the advantage that the colour image projection arrangement comprises a minimum number of optical components and that it is of a particularly compact structure.

A further embodiment of the colour image projection arrangement in accordance with the present invention, is characterized in that the light source is formed by a plurality of monochromatic light sources emanating a corresponding number of monochromatic light beams, the light sources forming part of separate colour channels in each of which a monochromatic reflective image display panel and a transition are arranged and that a system of colour-selective elements is provided before the projection lens system for combining the monochromatic image information-modulated light beams modulated into one colour image information-modulation light beam.

The invention will now be described in greater detail by way of example with reference to the accompanying drawings. Therein

Figure 1:
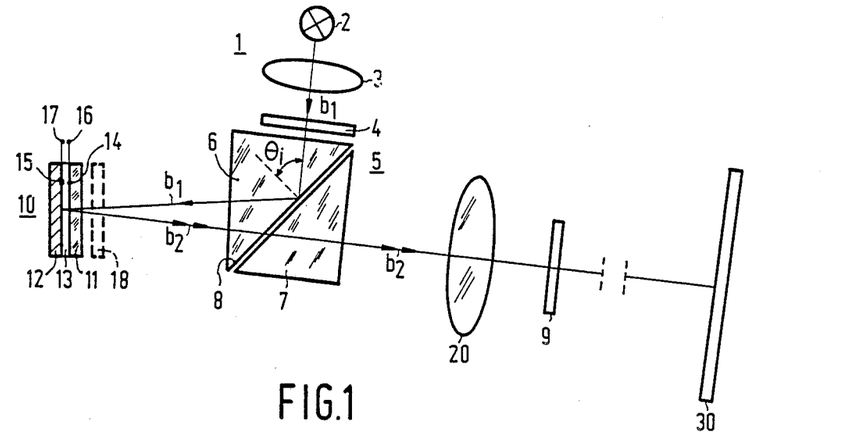
FIG. 1 shows a first embodiment of the image projection arrangement.

In FIG. 1, reference numeral 1 denotes an illumination system comprising a radiation source 2, for example a metal-halide lamp and a condensor system 3 which is schematically indicated by a single lens, although this system may include a plurality of lenses and/or mirrors. The illumination system produces a beam $b_1$ which is incident on image display panel 10. This panel is, for example, a liquid crystal panel (or LCD). Such a panel comprises a layer of liquid crystalline material 13, for example of the nematic type, which is enclosed between two plates 11 and 12. The plate 11 is transparent and, for example, made of glass, whilst the plate 12 may optionally be also transparent or reflecting. Each of the plates is provided with a control electrode 14, 15, the electrode 14 being transparent whereas the electrode 15, when a glass plate 12 is used, is reflective and, when a reflecting plate 12 is used, may be transparent. The electrodes can be divided into a large number of rows and columns, thus defining a large number of image elements in the display panel. The different image elements can then be controlled by driving the matrix electrodes, as is shown schematically by means of the drive terminals 16 and 17. Thus, an electric field can be applied at the desired position across the liquid crystalline material 13. Such an electric field causes a change of the effective refractive index of the material 13, so that the light passing through a given image element is submitted or not submitted to a rotation of the polarization direction, depending on whether a local electric field is present or not present in the region of the relevant image element.

Instead of this what is commonly referred to as passively controlled image display panel, an actively controlled panel may alternatively be used. In this latter type of image display panel one of the substrate plates is provided with an electrode whilst the other plate is provided with the semi-conductor drive electronics. Each of the image elements is now driven by its own active control element such as, for example, a thin film transistor.

Both types of directly driven image display panels are described in, for example, the European Patent Application no. 0,266,184.

The image display panel may alternatively be part of a more complex system such as the one described in the U.S. Pat. No. 4,127,322. In said system an image is generated with the aid of a cathode-ray tube. The light beam emanating from this tube is incident on a photoconductive layer in which a charge pattern is produced in accordance with the image on the cathode-ray tube. This causes an electric field to be formed across a layer of liquid crystalline material present between the photoconductive layer and a second, counter, electrode, also in accordance with the image on the cathode-ray tube. The varying electric field causes a variation of the double refraction in the liquid crystalline layer and consequently, within a projection beam incident on this layer, local differences in the rotation of the polarization direction. For an adequate operation this system must be provided with a number of additional layers. The arrangement disclosed in the U.S. Pat. No. 4,127,322 is intended for more professional applications.

For image projection with the aid of a display panel having a layer of liquid crystalline material the beam incident on this panel must be polarized, preferably be linearly polarized. However, the radiation source 2 generally radiates non-polarized light. Using a polarizer 4 a linearly polarized component having the desired polarization direction is selected from this light. In the radiation path of the beam $b_2$ reflected by the image display panel a polarization analyser 9 is provided the polarization direction of which is, for example, effectively parallel to the polarization direction of the polarizer 4. This causes the light originating from the image elements which are energized and do not change the polarization direction of the beam to be transmitted by the analyser to a projection lens system 20. The light originating from non-energized image elements which rotate the polarization direction of the beam through 90° is blocked by the analyser. The analyser 9 converts the polarization modulation of the beam into an intensity modulation. The projection lens system 20 which is shown schematically with one single lens element displays the display panel 10 on a projection screen 30. The optical path length between this screen and the lens system 20 is relatively long. So as to limit the dimensions of the arrangement, the radiation path between the projection system 20 and the screen 30 can be folded with the aid of reflectors.

In the embodiment described here the image elements across which no electric field is applied are displayed as black dots on the projection screen 30. It is alternatively possible to so control an image element, that is to say to apply such a field strength across it, that of the incident linearly polarized light the polarization direction is not rotated through 90° but that this linearly polarized light is converted into elliptically polarized light. A portion of this light is transmitted to the projection screen and the remaining portion is blocked. The relevant image element is then not displayed on the projection screen as a black or as a white element but as a grey element, the grey scale being adjustable.

Instead of using linearly polarized light, an image projection arrangement having liquid crystal display panels can in principle also be operated with circularly or elliptically polarized light. The image display panel can then slightly change the direction of rotation of the circularly polarized light or the ratio between the elliptical axes of the elliptically polarized light. With the aid of additional polarization means the light must ultimately be converted into linearly polarized light and said changes into changes of the polarization direction of this linearly polarized light.

If use is made of an image display system whose image elements in the driven state rotate the polarization direction and in the non-driven state do no longer rotate the polarization direction, an extra layer of liquid crystalline material which rotates the polarization direction of the full beam through 90° can be applied in series with the image display panel 10, so that the image on the projection screen has the same polarity as the image formed in an arrangement having an image display panel whose image elements do not change the polarization direction in the driven state.

An additional polarization rotator, which in FIG. 1 is denoted by reference numeral 18, can also be used if in an arrangement in which the image elements in the driven state do not change the polarization direction one yet wants to have these image elements appear as black elements on the projection screen, for example with the object of obtaining an increased contrast or to effect a decrease of the colour dependency of the arrangement, or to increase the switching rate of the display panel.

Instead of a layer of liquid crystalline material it is alternatively possible to use a $\lambda/4$-plate, wherein $\lambda$ is the wavelength of the projection light, as additional polarization rotator 18. This polarization rotator can also be applied in the embodiments still to be described.

FIG. 1 shows only the chief rays of the beams $b_1$ and $b_2$. These beams have however a given width such that they cover the entire image display panel 10. The projection lens system 20 may only catch light from the beam $b_2$ and no light from the beam $b_1$. In order to effect that the beams $b_1$ and $b_2$ are adequately separated in the region of the projection lens system without the necessity of the distance between this system and the image display panel to be large, use is made in accordance with the invention of an angle-dependent beam separator in the form of a composite prism system 5. This system comprises two transparent prisms 6 and 7 of glass or a synthetic resin material between which there is an air layer 8. Since the index of refraction $n_m$ of the prism material ($n_m$ is for example 1.5) exceeds the index of refraction, $n_l$, of air ($n_l = 1,0$) a light beam incident on the interface of the prism and air at an angle $\theta_i$ which exceeds or is equal to the what is commonly referred to as the critical angle $\theta_g$, for which it holds that $$\sin \theta_g = n_l/n_m$$

will completely be reflected. When the light beam is incident on the interface at an angle less than the critical angle the beam is fully transmitted. In the embodiment of FIG. 1 the index of the refraction of the prisms 6 and 7 and the orientation of the air layer 8 have been chosen such that the beam $b_1$ originating from the light source, is reflected in its totality by the interface 6, 8 towards the display panel 10 and the bundle $b_2$ originating from this panel is fully transmitted by this interface. The angle of incidence of the beam $b_1$ and the beam $b_2$, respectively, on the interface is therefore larger or smaller, respectively, than the critical angle.

The prism system effects that the chief ray of the beam $b_2$ encloses a wide angle, which may be near 90°, with the chief ray of the beam $b_1$. Consequently, the projection lens system 20 can be positioned near the display panel 10, so that the length of the image projection arrangement can be considerably less than in the absence of the prism system.

It is alternatively possible to choose the orientation of the interface 6, 8 relative to the directions of the beams $b_1$ and $b_2$ in such a manner that the beam $b_1$ is transmitted to the display panel 10, which is then located below the prism system, and the beam $b_2$ is reflected towards the projection lens system 20. This latter configuration provides the advantage, in the event of colour beam projection, that fewer colour aberrations occur in the modulated beam $b_2$.

Figure 2:
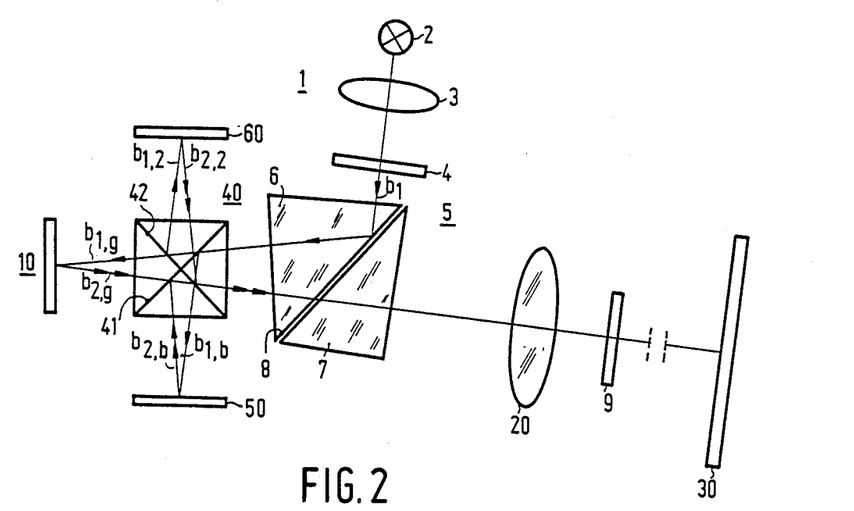
FIGS. 2, 3 show embodiments of a colour image projection arrangement.

If a colour image is to be projected, it is possible to use instead of an image display system having one image display panel a composite image display system which comprises, for example, three image display panels and a plurality of colour-selective beam splitters. FIG. 2 shows an embodiment of such a composite image display system.

In this embodiment the colour splitting is effected by what is commonly referred to as a dichroic cross 40 formed by two dichroic mirrors 41 and 42. The beam $b_1$ reflected by the interface 6, 8 is incident on the first dichroic mirror 41 which reflects, for example, blue light. The blue component $b_{1,b}$ is incident on the display panel 50 in which the blue sub-image is generated and the beam $b_{2,b}$ modulated with the blue image information is reflected to the dichroic cross 40 by the panel 50. The beam having a red and a green component and transmitted by the dichroic mirror 41 is incident on the second dichroic mirror 42 which reflects the red component $b_{1,r}$ to the display panel 60. In this panel the red sub-image is generated. The beam $b_{2,r}$ modulated with the red image information is reflected to the dichroic cross 40. The beam component $b_{1,g}$ transmitted by the mirror 42 is modulated by the green image display panel 10 and reflected as the beam component $b_{2,g}$ to the dichroic cross 40. Since the dichroic mirrors 41 and 42 again reflect the returning beam component $b_{2,b}$ and $b_{2,r}$ and transmit the beam component $b_{2,g}$, these beam components are combined in one beam $b_2$ which is modulated with the colour image information.

Figures 3, 4:
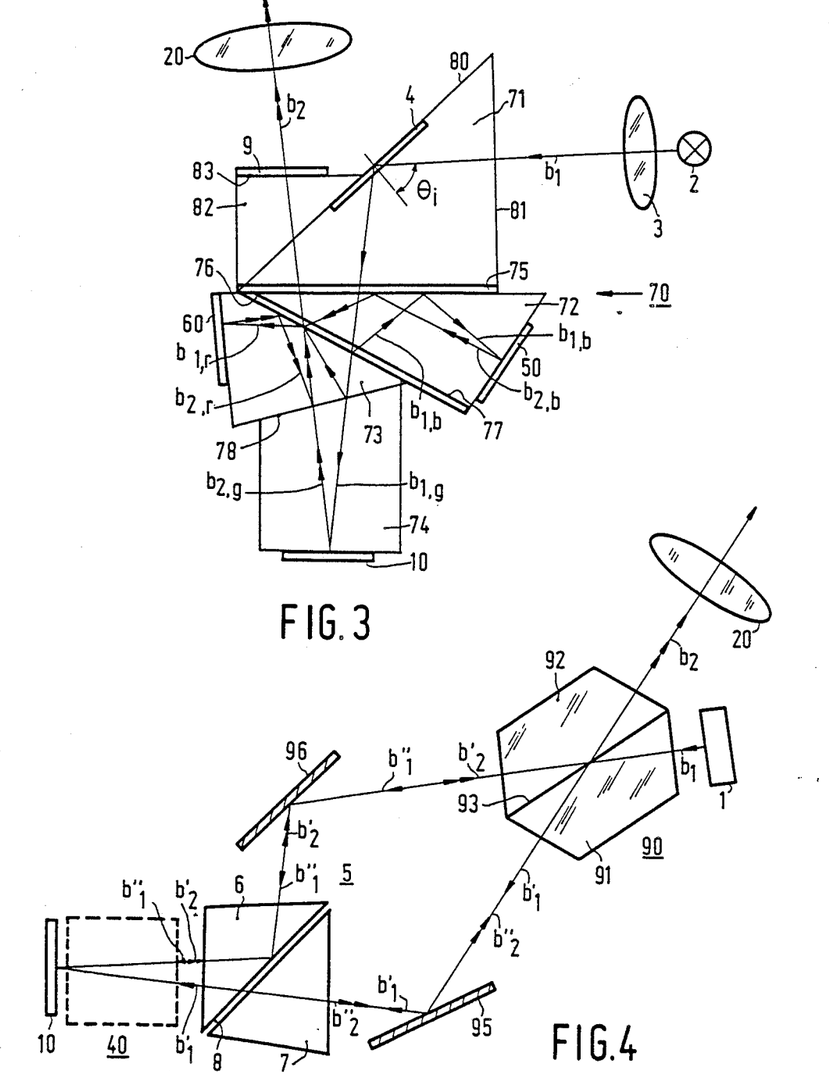
FIG. 4 shows a further embodiment of the image projection arrangement.

FIG. 3 shows a further embodiment of a colour image projection arrangement in which the layer of air at which the total reflection of the beam $b_1$ originating from the source occurs is not enclosed between two prisms. This embodiment comprises a prism system 70 by means of which both the beam separation and the colour splitting and colour recombination are affected. The system 70 is formed from three prisms 71, 72 and 73, a first air layer 75 being present between the prisms 71 and 72 and an air layer 76 being present between the prisms 72 and 73. The prism 72 is coated with a first dichroic layer 77 and the prism 73 with a second dichroic layer 78.

The beam $b_1$ originating from the source 2 enters the prism 71 via the plane 81 and is thereafter incident on the plane 80 which is an interface between the prism material, for example glass, and air. The angle of incidence $\theta_i$ exceeds the critical angle so that the beam $b_1$ is totally reflected. This beam passes the layer of air 75 since the angle of incidence on the interface of the prism material 72 to air is less than the critical angle. Thereafter the beam $b_1$ is incident on the dichroic layer 77 which reflects, for example, the blue component $b_{1,b}$. This beam component is incident at an angle larger than the critical angle onto the interface between the prism 72 and the layer of air 75 and is totally reflected to the blue display panel 50. The beam component $b_{2,b}$ modulated with the blue image information is totally reflected from the layer of air 75 of the dichroic layer 77 which reflects this beam component towards the projection lens system 20. The beam having the colour composition red and green which is transmitted by dichroic layer 77 is incident on the second dichroic layer 78 which reflects the red component $b_{1,r}$ and transmits the green component $b_{1,g}$ towards the green image display panel 10. The beam component $b_{2,g}$ modulated with the green image information is directly reflected to the projection lens system 20. The red beam component $b_{1,r}$ reflected by the dichroic layer 78 is totally reflected from the layer of air 76 to the red image display panel 60. The beam component $b_{2,r}$ modulated with the red image information is first totally reflected from the layer of air 76 and is thereafter refleted by the dichroic layer 78 and combined with the green beam component $b_{2,g}$. At the dichroic layer 76 these beam components are combined with the blue beam component $b_{2,b}$ and the complete beam $b_2$ is obtained which is modulated with the colour image information. This beam is incident on the interface 80 between the prism 71 and air at an angle less than the critical angle and is transmitted to the projection lens system 20.

Preferably the polarizer 4 and the analyser 9 are provided on the face 80 of the prism 71, so that these elements act simultaneously on the three colour components and there is no need for a separate system of such elements for each colour component, and in addition no separate carriers for the elements 4 and 9 are necessary.

In addition, a prism element 82 is preferably disposed on the face 80 of the prism 71. It can be ensured that the plane of incidence 81 or the exit plane 83, respectively, of the prism system has an equal orientation relative to the chief ray of the first and second beam, respectively, as an image display panel. As regards the projection beam $b_1$, $b_2$ the prism system 70 then behaves as a double plane-parallel plate, as a result of which the optical aberrations of the projection beam can be minimized in a simple manner.

FIG. 4 illustrates an embodiment of the image projection arrangement in which a very efficient use is made of the light coming from the illumination system 1. The beam $b_1$ produced by the source comprises two beam components $b'_1$ and $b''_1$ with mutually perpendicular directions of polarization. The beam $b_1$ is incident on a polarization-sensitive beam splitter 90. This beam splitter may be formed from two transparent prisms 91 and 92 between which a polarization-separating layer 93 is provided. The layer 93 reflects the beam component $b'_1$ whose polarization direction is parallel to the plane of incidence, and which is commonly denoted as the p-component, and transmits the component $b''_1$ whose polarization direction extends transversely of the plane of incidence, and which is commonly referred to as the s-component. The plane of incidence is the plane formed by the chief ray of the incident 93 beam and the normal to plane 93.

The beam component $b'_1$ reflected by the layer 93 is directed to the image display panel 10 by a reflector 95. This component passes through the air layer 8 of the angle-dependent beam seperator 5 because its angle of incidence is less than the critical angle. The beam component $b'_2$ which is modulated with the image information and is reflected is incident at an angle larger than the critical angle on the air layer 8 and is totally reflected to a reflector 96 which reflects the component $b'_2$ to the polarization-sensitive beam splitter 90. The light coming from the energized image elements of the panel 10, which do not change the polarization direction is reflected to the projection lens system 20 by the layer 93. The light coming from the nonenergized image elements is transmitted by the layer 93 to the illumination system 10.

The s-polarized beam component $b''_1$ is reflected by the reflector 96 to the beam splitter 5, is subjected there to a total reflection to the image display panel 10, is there modulated with the image information and is reflected, thereafter passes through the beam splitter 5 and is finally reflected by the reflector 95 to the polarization-sensitive beam splitter 90. Of this beam component $b''_2$ those portions which originate from the energized image elements are transmitted to the projection lens system.

The beam splitter 90 does not only provide that two beam components $b'_1$ and $b''_1$ are formed, but also that these components after having been modulated by the image display panel are combined again to one beam $b_2$. In addition, the polarization-sensitive beam splitter 90 provides that the polarization modulation of the beam components is converted into an intensity variation of these components. Consequently, this beam splitter also replaces a polarizer and an analyser which otherwise have to be provided before and behind, respectively, the image display panel. Because of the diverse functions of the beam splitter 90 the number of elements in the embodiment of FIG. 4 can be limited to a minimum.

Instead of having one image display panel, the arrangement shown in FIG. 4 may alternatively be provided with a composite image display system in a similar manner as described with reference to FIG. 2. The dichroic cross 40 of last-mentioned Figure is schematically represented in FIG. 4 by reference numeral 40.

Figure 5:
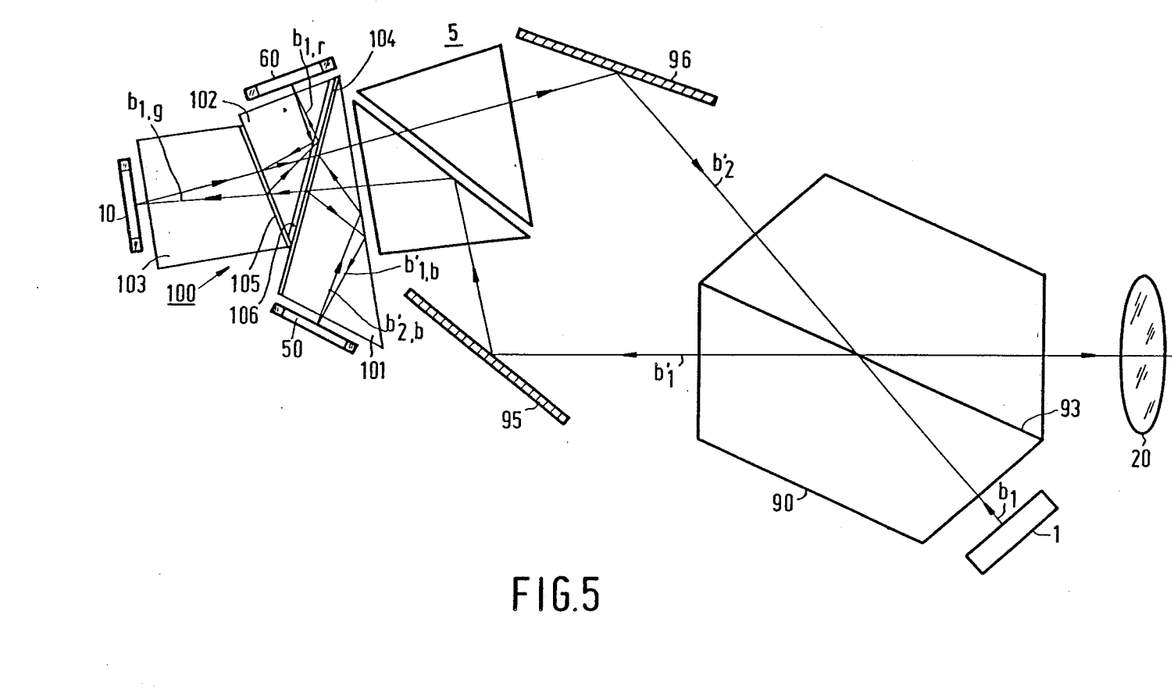
FIG. 5 shows a colour image projection arrangement in accordance with this embodiment.

The colour split can also here be effected by means of what is commonly referred to as a colour-splitting prism system. FIG. 5 shows how such a system 100 can be arranged in the colour image projection arrangement with reflecting image display panels 10, 50 and 60 for generating the green, blue and red sub-image, respectively. The prism system 100 is formed by three prisms 101, 102 and 103, a first dichroic layer 104 being provided on the interface between the prisms 101 and 102 and a second dichroic layer 105 being provided on the interface between the prisms 102 and 103.

The dichroic layer 104 reflects the blue beam component $b'_{1,b}$ to the front face of the prism 101, which borders on air, at such an angle that this beam component is reflected to the blue display panel 50. Of the light transmitted by the dichroic layer 104 the green component $b'_{1,g}$ is transmitted to the green image display panel 10 whilst the red component $b'_{1,r}$ is reflected to the front side of the prism 102. A layer of air 106 is present between this front side and the dichroic layer 104. The sub-beam component $b'_{1,r}$ is incident on the glass-to-air interface at such an angle that this component is reflected to the red display panel 60. In a similar manner in which the beam $b'_1$ is split by the prism system 100 in the differently coloured sub-beam components, the components $b'_{2,b}$; $b'_{2,g}$ and $b'_{2,r}$, after having been modulated by the associated display panels 50, 10 and 60, are recombined by the same system 100 to a sub-beam $b'_2$. The polarization-sensitive beam splitting prism 90 converts the polarization modulation of this sub-beam into an intensity modulation. The beam $b''_1$, not shown in FIG. 5, travels through the same path as the sub-beam $b'_1$ but in the opposite direction.

A polarization-sensitive beam splitter in the image projection arrangement can be constituted in known manner by a Wollaston prism consisting of two cemented-together prisms of double-refractive material, the optical axis of the two prisms being perpendicular to each other. It is alternatively possible to utilize a what is commonly denoted as a Glan-Thompson prism or a Glan-Taylor prism of double-refractive material, in which one beam component having one of the polarization directions, p or s, is subjected to total internal reflection at a prism face and the other component is not subjected to such an internal reflection. The two last-mentioned prisms as well as the Wollaston prism are expensive because of the double-refractive material to be used for them.

Figures 6, 7:
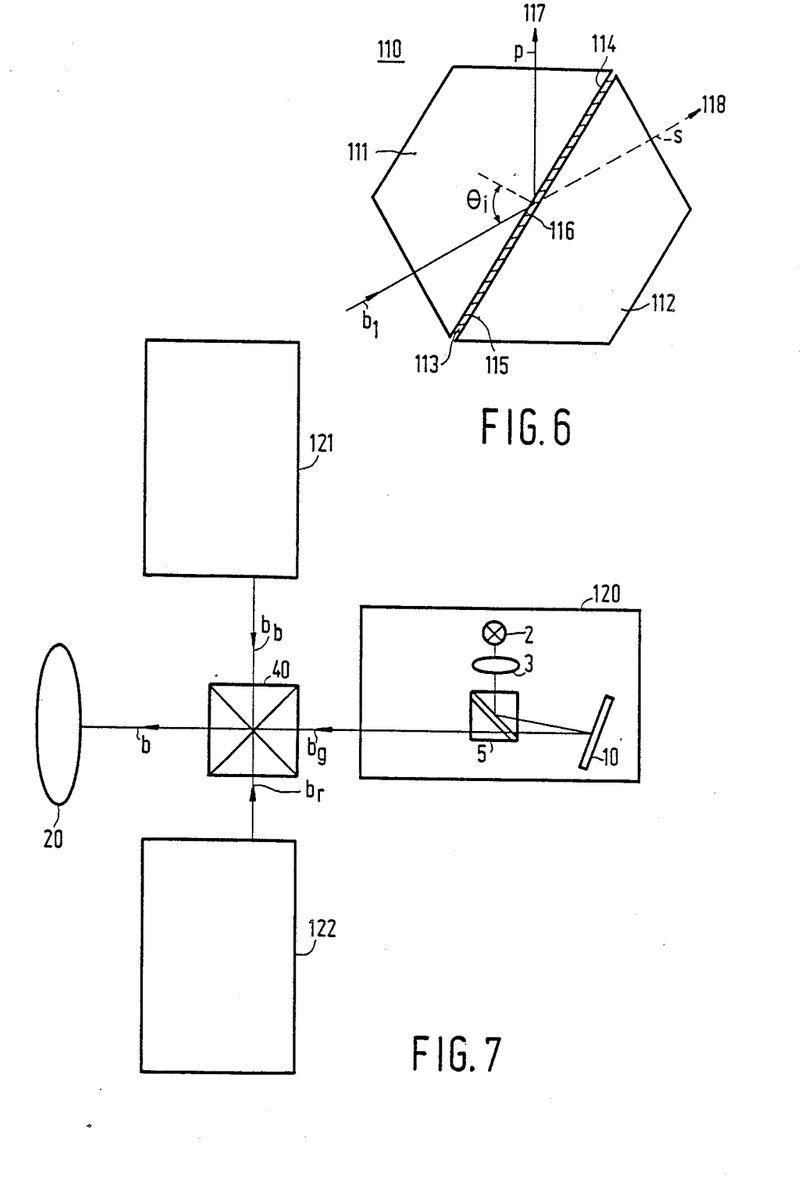
FIG. 6 shows an embodiment of a polarization-sensitive beam splitter preferably used in the projection arrangement.
FIG. 7 shows an embodiment of a colour image projection arrangement having three light sources.

Therefore, reference should be given to the use in image projection arrangements, more specifically those intended for consumer usages, of the beam splitter shown in FIG. 6. This beam splitter 110 is formed by two transparent prisms 111 and 112 of, for example, glass, with an intermediate layer 113. This layer is formed by a double-refractive material, preferably a liquid crystalline material which may evidence a high double reflection. The ordinary index of refraction $n_o$ of the liquid crystalline material is substantially always equal to approximately 1.5, whilst the extraordinary index of refraction $n_e$ can have a value between 1.6 and 1.8 depending on the composition of the layer 113. If the layer 113 consists of a liquid crystalline material, the prisms 111 and 112 are provided with what are commonly referred to as orientation layers 114 and 115 which ensure that the optical axis of the layer 113 is perpendicular to the plane of drawing. In FIG. 6 this axis is indicated by the circle 116.

The beam $b_1$ incident on the beam splitter has two polarization components, the p- and s-polarized components. Measures have been taken to ensure that the refractive index of the prism material is equal to $n_e$ of the layer 113, for example 1.8. If the beam $b_1$ is incident on the layer 103 at an angle of incidence $\theta_i$ which exceeds or is equal to the critical angle $\theta_g$, the p-polarized beam component is subjected to a total reflection in the direction of the arrow 117 as the ordinary index of refraction applies to this component. For the s-polarized beam component, whose direction of polarization extends transversely of the plane of incidence, the extraordinary refractive index of the liquid crystalline material applies, so that this component does not "see" any refractive index difference on passing through the beam splitter, and consequently passes through the layer 113 and the prism 112 in the original direction.

Since the refractive index difference $\Delta n = n_e - n_o$ of liquid crystalline material can be great, the beam splitter 110 made of such a material is suitable for a large range of angles of incidence. In addition, it can be ensured that the refractive index of the prism material and that of the layer 113 vary in the same way with varying wavelength of the beam $b_1$, so that the beam splitter has a high polarization efficiency over a large wavelength range. A very important advantage of the beam splitter of FIG. 6 is that it is cheap since no expensive double-refractive prism material need to be used and its production is relatively simple.

There is no need for the prisms 111 and 112 to be solid, it is alternatively possible for these prisms to consist of glass, or other transparent, walls in which a transparent liquid or synthetic material having a high refractive index, equal to $n_e$ of the layer 113 is applied. These walls must have the same refractive index as the liquid or synthetic resin material which shall not evidence any depolarizing effects.

The beam splitter 110 can also be used for combining the sub-beams $b'_1$ and $b''_2$ after they have been modulated with image information by the reflecting image display panels.

FIG. 7 shows schematically and in a plan view a colour image projection arrangement having three colour channels 120, 121 and 122 for the respective primary colours green, blue and red. Each of these colour channels comprises a separate radiation source, an angle-dependent beam splitter and a reflective image display panel. These elements 2, 5 and 10 are shown in the green channel. For the other channels the corresponding elements are arranged in a similar manner. The differently coloured beams $b_g$, $b_b$ and $b_r$ modulated with the image information are combined by a dichroic cross 40 or a colour-combining prism system to one beam b which is projected on a display screen, not shown, by the projection lens system.

Each of the colour channels 120, 121, 122 of the arrangement shown in FIG. 7 can alternatively be provided, similar to FIG. 4, with a polarization-sensitive beam splitter so that two mutually perpendicularly polarized beams are formed which are modulated by the same image display panel and are thereafter recombined, so that an optimum use of the available light is made.

A directly controlled reflective LCD display panel which can be used in the arrangement according to the invention is disclosed in the U.S. Pat. No. 4,239,346.

The inventive idea is also suitable for use in a colour image projection device in which only one display panel is used. This arrangement may be of a structure as shown in the FIGS. 1 and 4, in which the monochrome panel 10 is replaced by a composite or colour panel. This colour panel then comprises a number of image elements which is, for example, three times as large as the number of image elements of a monochrome panel. The image elements of the colour panel are arranged in three groups, a red, green and blue sub-image being generated by these groups. An image element of each of the groups is always added to an image element on the projection screen. Each of the image elements is then, for example, preceded by an individual colour filter which only transmits the colour desired for the relevant image element.

I claim:

1. An image projection arrangement comprising a light source for producing a first light beam, a reflective image display system arranged in the path of the first light beam and having at least one image display panel for generating an image to be projected, a projection lens system arranged in the path of a second light beam originating from the image display system for projecting the image produced by the image display system onto a projection screen, characterized in that between the light source and the image display system on the one hand and between this system and the projection lens system on the other hand a transition from a first to a second medium is provided, these media having different refractive indices, the transition being arranged such that one of the first and second light beams is totally reflected by the transition whilst the other light beam is transmitted by the transition.

2. An image projection arrangement as claimed in claim 1, characterized in that the transition is constituted by an interface between air and a transparent material.

3. An image projection arrangement as claimed in claim 2, characterized in that the transition is included in a prism system which consists of two transparent prisms having an air layer between two facing surfaces of the prisms.

4. An image projection arrangement as claimed in claim 1, 2 or 3, in which the image display system modulates the polarization direction of the second light beam in accordance with the image information, characterized in that in the radiation path from the light source to the transition on the one hand and in the radiation path from this transition to the projection lens system on the other hand a polarization-sensitive beam splitter is provided for splitting the beam originating from the light source into two mutually perpendicularly polarized sub-beams which are both incident on the image display system and for recombining the two sub-beams after they have been modulated with the image information.

5. An image projection arrangement as claimed in claim 1, 2, 3 or 4, characterized in that the image display system is a colour image display system comprising colour-selective elements and a composite image display panel whose image elements are divided into groups, each group of image elements generating a sub-image of a given colour corresponding to the colour of the colour-selective elements belonging to the relevant group of image elements.

6. An image projection arrangement as claimed in claim 5, characterized in that the colour-selective elements are constituted by a number of colour-selective beam splitters for splitting a light beam into three monochromatic sub-beams of different colours and for combining the sub-beams modulated with monochrome image information into one colour image information-modulated light beam, and in that in the path of each of the sub-beams a separate image display panel is arranged whose collective image elements constitute one of said groups of image elements.

7. An image projection arrangement as claimed in claim 6, characterized in that the colour image display system includes one image display panel whose image elements are arranged in groups, each group generating a sub-image of a given colour and in that for each of the image elements a colour filter is provided which only transmits light of that colour that corresponds to the colour of the sub-image to be generated by the group to which the relevant image element belongs.

8. An image projection arrangement as claimed in claim 1, 2, 3 or 4, for projecting a colour image, characterized in that the light source is constituted by a plurality of monochrome light sources emanating a corresponding number of monochromatic light beams, the light sources forming part of separate colour channels in each of which a monochromatic reflective image display panel and a transition are arranged and that the projection lens system is preceded by a system of colour-selective elements for combining the monochromatic image information-modulated light beam into one colour image information-modulated light beam.

* * * * *

(12) EX PARTE REEXAMINATION CERTIFICATE (8231st)
United States Patent
van den Brandt (10) Number: US 4,969,730 C1
(45) Certificate Issued: May 17, 2011

(54) IMAGE PROJECTION ARRANGEMENT (75) Inventor: Andrianus H. J. van den Brandt, Eindhoven (NL)

(73) Assignee: U.S. Philips Corporation, New York, NY (US)

Reexamination Request:
No. 90/010,720, Nov. 25, 2009

Reexamination Certificate for:
Patent No.: 4,969,730
Issued: Nov. 13, 1990
Appl. No.: 07/327,288
Filed: Mar. 22, 1989

(51) Int. Cl.
*H04N 9/31* (2006.01)
*G02B 27/14* (2006.01)

(52) U.S. Cl. .............................. 353/31; 353/30; 353/34; 353/37; 348/E9.027; 359/633

(58) Field of Classification Search .................... 353/31
See application file for complete search history.

(56) References Cited

U.S. PATENT DOCUMENTS

| 3,001,015 A | 4/1959 | Weiss |
| 3,659,918 A | 5/1972 | Tan |
| 3,677,621 A | 7/1972 | Smith |
| 3,806,257 A | 4/1974 | Amos |
| 3,893,758 A | 7/1975 | Hunzinger et al. |
| 3,932,027 A | 1/1976 | Cook et al. |
| 4,084,180 A | 4/1978 | Stoffels et al. |
| 4,127,322 A | 11/1978 | Jacobson et al. |
| 4,335,939 A | 6/1982 | Stovell et al. |
| 4,500,172 A | 2/1985 | Gagnon |
| 4,545,651 A | 10/1985 | Kato et al. |
| 4,564,931 A | 1/1986 | O'hara et al. |
| 4,687,301 A | 8/1987 | Ledebuhr |
| 4,818,074 A | 4/1989 | Yokoi et al. |
| 4,826,311 A | 5/1989 | Ledebuhr |

FOREIGN PATENT DOCUMENTS

| JP | 60-262130 | 12/1985 |
| JP | 63-311322 | 12/1988 |

OTHER PUBLICATIONS

Stephany, U.S. Defensive Publication No. T938,006, Imaging System, filed Oct. 11, 1974, published Sep. 2, 1975.

*Primary Examiner* — Anjan K. Deb (57) ABSTRACT

An image projection arrangement is described which comprises a light source (1) for producing a first light beam ($b_1$), a reflective image display system (10) provided in the path of this light beam and a projection lens system (20), arranged in the path of a second light beam ($b_2$) originating from the image display system. A beam-separating element (5) whose operating principle is based on total internal reflection of one of the beams ($b_1$, $b_2$) is provided in the light path between the light source and the image display system on the one hand and said system and the projection lens system on the other hand. This sresults in an adequate separation of these beams while the dimensions of the arrangement remain limited.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3, 5 and 6 are cancelled.

Claims 4, 7 and 8 were not reexamined.

* * * * *